Patented June 17, 1930

1,764,502

UNITED STATES PATENT OFFICE

HENRY BLUMENBERG, JR., OF LOS ANGELES, CALIFORNIA

PROCESS OF MAKING ALUMINUM CHLORIDE

No Drawing. Original application filed April 14, 1927, Serial No. 183,923. Divided and this application filed February 12, 1930. Serial No. 427,963.

My invention relates to a process of making aluminum chloride, whereby the same may be produced in a simple, efficient and economic manner.

My process is based on the fact that when ammonium chloride or a chloride of the alkali metal or alkaline earth metal group is mixed with aluminum sulphate, a double decomposition takes place, forming aluminum chloride and a sulphate of the alkali forming group.

The present application is a division of my application for a process of making aluminum chloride, Serial No. 183,923, filed April 14, 1927, and in which the claims are limited to the use of ammonium chloride of the alkali metal group. The claims of the present case are limited to the alkaline earth metal group.

When the heavier alkaline metal chlorides are used a higher reaction temperature is required than when ammonium chloride or a chloride of the alkaline earth metal group is used, and therefore I prefer to add to the mixture a reducing agent which will reduce aluminum sulphate to aluminum sulphide as an intermediate step in the process, the aluminum sulphide reacting more vigorously with the alkaline earth metal chloride to produce aluminum chloride.

My invention consists of the steps of the process hereinafter described and claimed.

I take a chloride of the alkaline earth metal group such as calcium chloride and mix the same with aluminum sulphate; both salts being preferably finely ground and intimately mixed, in the proportions indicated by the molecular weights in the following equation:

and heat the same in a retort to a temperature of from 600 to 700 degrees C., when the reaction indicated in the equation will take place, forming aluminum chloride which will distill over and which may be recovered in any preferred manner, and the calcium sulphate will remain in the retort.

I have found that by the addition of 5 to 20 percent of a reducing agent, such as carbon in the form of charcoal or carbonaceous matter including the hydrocarbon oils and naphthalene, the reaction temperature is lowered, which is due to the fact that the reducing agent will reduce the aluminum sulphate to aluminum sulphide, which energetically combines with the chloride of the alkaline earth metal forming aluminum chloride.

Other chlorides of the alkaline earth metal may be used in place of calcium chloride and will form aluminum chloride and the corresponding alkaline earth metal sulphate.

Various changes may be made in the steps of the process by those skilled in the art without departing from the spirit of my invention as claimed.

I claim:

1. A process of making aluminum chloride comprising heating a mixture of a chloride of the alkaline earth metal group, aluminum sulphate and a carbonaceous material to a temperature sufficient to cause the aluminum sulphate to be reduced to aluminum sulphide, which latter will react with said chloride to produce aluminum chloride, and distilling and recovering said aluminum chloride.

2. A process of making aluminum chloride comprising heating a mixture of calcium chloride, aluminum sulphate and a carbonaceous material to a temperature sufficient to cause the aluminum sulphate to be reduced to aluminum sulphide, which latter will react with the calcium chloride to form aluminum chloride, and distilling and recovering said aluminum chloride.

In testimony whereof I have signed my name to this specification.

HENRY BLUMENBERG, JR.